3,258,449
POLYOLEFINS STABILIZED WITH 2,6-DITERTIARY BUTYL-p-CRESOL AND ORGANIC SULFIDES
Claus Heuck, Hofheim, Taunus, Otto Mauz, Frankfurt am Main, Jakob Winter, Hofheim, Taunus, and Felix Schulde, Neuenhain, Taunus, Germany, assignors to Farbwerke Hoechst Aktiengesellschaft vormals Meister Lucius & Brüning, Frankfurt am Main, Germany, a corporation of Germany
No Drawing. Filed June 2, 1960, Ser. No. 33,393
Claims priority, application Germany, June 10, 1959, F 28,654
2 Claims. (Cl. 260—45.95)

The present invention relates to a process for improving polyolefins.

Many highly polymeric compounds undergo degradation under the action of oxygen at elevated temperatures, particularly under the influence of light. In the course of this degradation, the physical properties of the starting product, such as the strength, elongation or hardness of the product, may deteriorate such that it can no longer be used for industrial purposes. In order to prevent such a degradation, there may be applied numerous improving agents called stabilizers.

Thus phenols and phenol derivatives, for example on the basis of 4,4'-dihydroxy-diphenylmethane or 4,4'-dihydroxy-dimethylmethane have been described to be particularly effective age resisters, for example for high-pressure (branched) polyolefins and low-pressure (linear) polyolefins. There are also cited in various patents aminophenols and sulfurous phenol derivatives obtained by condensing alkyl phenols with monosulfur dichloride or disulfur dichloride.

However, the aforementioned age resisters have—inasmuch as phenol derivatives are concerned—the disadvantage that the stabilizing action is insufficient in some cases while the sulfurous phenol derivatives decompose in many cases and discolor the synthetic plastic on account of the high processing temperatures applied especially in the case of polypropylene.

Now we have found that a particularly effective stabilization of olefin polymers, accompanied by an improvement in the age resisting properties, can be attained by admixing the polyolefins with a composition of phenol derivatives and dialkyl sulfides. The alkyl groups in the dialkyl sulfides can be substituted by aliphatic radicals containing 1 to 31 carbon atoms, further by aromatic or araliphatic radicals.

These dialkyl sulfides which may be prepared in known and simple manner, for example, from alkyl halides, such as amyl-, hexyl-, octyl-, dodecyl-, hexadecyl-, octadecyl-, eicosyl- and myricyl-chloride, and sodium sulfide produce, when applied as such, none or only an insignificant resistance to aging in the various polyolefins.

When combining these dialkyl sulfides with a phenolic age resister, however, a synergistic effect is produced raising the age resistance of the phenolic substances in an unexpected manner.

According to present knowledge, there may be distinguished two types of stabilizers or age resisters with respect to their efficacy:

(a) Substances having a specific action as antioxidants,
(b) Substances which, as such, are not effective as antioxidants or only in a low degree but which, in mixture with compounds of group (a), appreciably enhance the efficacy (so-called costabilizers).

The antioxidants bring about the discontinuance of the chain reaction of the autoxidation by intercepting and rendering harmless the radicals formed in the course of this process. These antioxidants generally have a phenolic structure.

The substances of group (b) having a synergistic action exhibit, when applied as such, none or only an insignificant age resisting action; however, they increase the action of the antioxidants mentioned in group (a) in a high degree. They can regenerate the antioxidants which are gradually used up by oxidation, and likewise render harmless the traces of metal compounds that have a prooxidative action by the formation of salts or by chelation.

As phenolic components there were applied alkylated phenols, condensation products of monoalkyl phenols and dialkyl phenols, with aldehydes and ketones, such as orthocresol, tertiary butyl phenol, nonyl phenol, nonyl paracresol, thymol, 2,4-di-tertiary-butyl phenol, 2-methyl-4-tertiary-butyl phenol, 2,4-di-i-octyl phenol, 2,4-di-i-nonly phenol etc. with formaldehyde, propionaldehyde or acetone, cyclohexanone, etc.

In order to increase the stabilizing action as a costabilizer, an aliphatic or aromatic sulfide is added to the phenolic component. The sulfide can, in the simplest case, have a symmetric structure, R—S—R, in which R is an aliphatic radical containing 4 to 25 carbon atoms, a hydroaromatic or aromatic hydrocarbon radical.

The sulfide may also have an asymmetric structure according to the formula R—S—R', in which R and R' are aliphatic radicals containing 4 to 25 carbon atoms, hydroaromatic or aromatic hydrocarbon radicals of different constitution; or R represents an aliphatic hydrocarbon chain and R' a hydroaromatic hydrocarbon-, benzene-, thiophene-, naphthalene-nucleus, or a higher condensed nucleus.

Moreover, there can also be contained in the molecule several sulfur atoms which are, however, separated by carbon atoms. These compounds have the general formula:

$$R—S—(R')_n—S—R$$

in which R is a hydrocarbon radical of a hydroaromatic or aromatic nature containing 4 to 25 carbon atoms, and R' is a hydrocarbon radical, while the subscript $n$ has a value of 1 to 20. R' may also contain hetero atoms, such as oxygen, nitrogen, etc., for example the following groups:

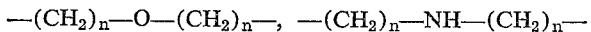

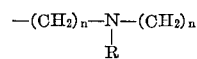

or it may be a benzene-, thiophene-, naphthalene- or anthracene-nucleus, as well as hydrogenated nuclei which may, in addition, be alkylated.

Compounds of this kind are obtained by reacting with mercaptans dialkyl halides, such as dichloromethane, 1,2-dichloroethane, 1,3-dichloropropane, 1,4-dichlorobutane or β,β′-dichlorodiethyl ether, bis-(chloromethyl)-naphthalene, bis-(chloromethyl)-thiophene, dichloropentamethylbenzene, 1,4-di-(chloromethyl)-benzene, etc.

If, furthermore, mercaptans are reacted with, for example, carbon tetrachloride, tetrachloroethane, hexachloroethane, compounds are obtained containing in the molecule an even greater number of sulfur atoms and which, in combination with phenolic age resisters, yield a very good synergistic effect.

With regard to compatibility, sulfides carrying long aliphatic hydrocarbon radicals, such as octyl radicals, dodecyl radicals and octadecyl radicals, are especially effective for the stabilization of polyolefins, such as polyethylene, polypropylene, polybutene and polymethylpentene.

The total amount of age resisters and costabilizers required amounts in general in the case of normally stressed shaped articles to 0.001 to 5%, preferably 0.05 to 1%. The two components should be used in the ratio of 5:1 to 1:5 parts by weight, preferably 1:1. Thus polypropylene can be stabilized in an excellent manner by mixing it with 0.25% by weight of dioctadecylsulfide.

The great advantage gained when applying such compositions of antioxidants of group (a) and the cited costabilizers of group (b) does not lie solely in the fact that there took place a noticeable increase in the stability of the polyolefins, but that it had become possible to reduce the appropriate proportions of such compositions in view of possibly occurring discolorations of the synthetic plastics.

In the following table there is enumerated the brittle time (measured at 140° C.) for polypropylene containing, in each case, 0.5% of the mentioned stabilizer combination in the ratio of 1:1. As brittle time there is indicated the time (in days) after which a compression molded polyolefin sheet having a thickness of 1 mm. breaks upon bending.

The process according to the invention can be applied with special advantage to low-pressure homopolymers or low-pressure copolymers obtained, for example, by the Ziegler process (cf. Raff-Allison "Polyethylene" (1956), pp. 72–81). Here, the polymers are formed from an olefin in the presence of a catalyst prepared from a mixture of an organo metallic compound and a compound of a heavy metal selected from the group of IVB to VIB of the Periodic Table.

The following example serves to illustrate the invention, but it is not intended to limit it thereto:

EXAMPLE

*Stabilization of polypropylene*

Embrittlement in days (at 140° C.) while the total concentration of stabilizer amounted to 0.5% (0.25% by weight of a condensation product of nonyl phenol and acetone and 0.25% of the synergist listed in the table):

Test results obtained with stabilizer mixtures composed of: 0.25% of a condensation product of nonyl phenol and acetone with the addition of 0.25% of a costabilizer,

| Costabilizer | Concentration, Percent | Brittle time at 140° C., (days) | Shade after tempering |
|---|---|---|---|
| Didodecyl sulfide | 0.25 | 40 | Unchanged, colorless. |
| Dioctadecyl sulfide | 0.25 | 40 | Do. |
| Dieicosyl sulfide | 0.25 | 40 | Do. |
| 1,2-bis-(octadecyl-mercapto)-ethane | 0.25 | 27 | Do. |
| 1,4-bis-(octadecyl-mercapto)-butane | 0.25 | 20 | Do. |
| Bis-(octadecyl-mercapto)-diethylether | 0.25 | 38 | Do. |
| 1,2,4,5-tetramethyl-2,4-di-(dodecyl-mercapto)-benzene | 0.25 | 20 | Do. |
| Tetra-(dodecyl-mercapto)-methane | 0.25 | 15 | Do. |
| Tetra-(octadecyl-mercapto)-ethane | 0.25 | 20 | Do. |
| Hexa-(dodecyl-mercapto)-ethane | 0.25 | 15 | Do. |
| Condensation product of nonyl phenol plus acetone (without costabilizer) | 0.25 | 3 | Do. |
| Do | 0.50 | 4–5 | Do |
| Furthermore, by way of comparison, the thio compounds without addition: | | | |
| Didodecyl sulfide | 0.50 | 2 | Do. |
| Dioctadecyl sulfide | 0.50 | 3–4 | Do. |
| Dieicosyl sulfide | 0.50 | 3 | Do. |
| 1,4-bis-(octadecyl-mercapto)-butane | 0.50 | 1 | Do. |
| Bis-(octadecyl-mercapto)-diethylether | 0.50 | 2–3 | Do. |
| Tetra-(octadecyl-mercapto)-ethane | 0.50 | 1 | Do. |
| Hexa-(dodecyl-mercapto)-ethane | 0.50 | 1 | Do. |

As results from the table, the polypropylene is extraordinarily well stabilized against embrittlement by the new stabilizer system. With the incorporation of the costabilizer having a synergistic action, the periods of stabilization attained are many times the periods of stabilization which were attained with the known stabilizers.

Analogous values are obtained when 0.25% by weight of 2,6-di-tertiary-butyl-p-cresol, styrophenol or condensation products of camphene and phenols, containing 0.25% by weight of the costabilizers listed in the above table, is applied for the stabilization of polypropylene or polyethylene.

We claim:

1. A composition of matter comprising (a) 2,6-di-tertiary-butyl-p-cresol, (b) an organo sulfide selected from the group consisting of R—SR′, R—S—(CH$_2$)$_n$—S—R′ and R—S—CH$_2$CH$_2$—O—CH$_2$CH$_2$—S—R′, wherein R and R′ are alkyl radicals containing 4 to 25 carbon atoms and $n$ is an integer from 1 to 4, and (c) a normally solid polymer prepared by reacting a member of the group consisting of ethylene, propylene, butene, methylpentene and mixtures thereof in the presence of a catalyst prepared from a mixture of an organo-metallic compound and a compound of a heavy metal selected from the group IVB to VIB of the Periodic Table, the total phenol and sulfide compounds being present in an amount by weight of 0.001 to 5% in a ratio of 5:1 to 1:5 parts by weight.

2. A composition of matter comprising (a) a normally solid polymer of an alpha-mono-olefin selected from the group consisting of ethylene, propylene and butene, (b) .005 to 2% by weight of 2,6-di-tert butyl-4-methyl phenol, and (c) from .005 to 2% by weight of a compound having the formula R—S—R′—S—R wherein R is an alkyl radical having from 12–20 carbon atoms and R′ is an alkylene having from 1–4 carbon atoms, the phenol and sulfide compounds being present in a ratio of 1 to 5 parts by weight.

(References on following page)

References Cited by the Examiner

UNITED STATES PATENTS

| | | | |
|---|---|---|---|
| 2,300,069 | 10/1942 | Skooglund | 260—45.7 |
| 2,727,879 | 12/1955 | Vincent | 260—45.9 |
| 2,843,577 | 7/1958 | Freidlander et al. | 260—45.7 |
| 2,967,850 | 1/1961 | Hawkins et al. | 260—45.7 |
| 2,985,617 | 5/1961 | Salyer | 260—45.95 |
| 2,995,539 | 8/1961 | Barker et al. | 260—45.7 |
| 3,010,937 | 11/1961 | Roos et al. | 260—45.7 |
| 3,020,259 | 2/1962 | Schulde et al. | 260—45.7 |

LEON J. BERCOVITZ, *Primary Examiner.*

M. STERMAN, *Examiner.*

H. W. HAEUSSLER, H. LEVINE, *Assistant Examiners.*

Notice of Adverse Decision in Interference

In Interference No. 96,113 involving Patent No. 3,258,449, C. Heuck, O. Mauz, J. Winter and F. Schulde, POLYOLEFINS STABILIZED WITH 2,6-DITERTIARY BUTYL-p-CRESOL AND ORGANIC SULFIDES, final judgment adverse to the patentees was rendered Mar. 26, 1968, as to claim 1.
   [*Official Gazette July 2, 1968.*]